United States Patent Office 3,148,996
Patented Sept. 15, 1964

3,148,996
FOAMED CERAMIC
Mark S. Vukasovich, Wickliffe, and Herbert L. Johns, Cleveland, Ohio, assignors to Horizons Incorporated, a corporation of New Jersey
No Drawing. Filed Mar. 26, 1962, Ser. No. 182,677
10 Claims. (Cl. 106—87)

This invention relates to a light-weight insulating ceramic material which has particular utility as insulation in buildings and other structures and to the manner in which it is formed. More particularly, it relates to a foamed composition which is foamed and formed into useful products without the application of heat from any external source, and which readily adheres and bonds to paper, ceramic or metallic surfaces while it is being foamed.

The products of the present invention can be prepared in a factory and brought to the site where they are to be used, or they can be formulated and applied in the field which is particularly useful when structural fabrication is to be accomplished at the site at which the compositions are prepared. The properties of low dielectric; high thermal resistance; good fired and unfired strength; good thermal insulating properties; good adhesion to paper, metal and masonry or ceramic surfaces; insolubility in water; and fireproof, nonpoisonous, and vermin-proof nature contribute to the utilization of the products as thermal curtain walls, insulation about unusual geometric shapes; formation of temporary or emergency housing; patching of existing insulation; encapsulation of articles to be protected from high temperatures or other environments and as potting for electronic gear.

One object of this invention is to provide a light-weight porous ceramic which is foamed without the application of external heat.

Another object of this invention is to provide a ceramic which sets up or hardens into a porous monolithic mass having good insulative properties.

Still another object of this invention is to provide a low density refractory composition which attains a stable set without the application of heat, and without the presence of any alkali metal silicate activated aqueous silica sol binder as described in U.S. Patent 2,992,930, issued July 18, 1961, to Wheeler and Olivito.

Still another object is to provide a ceramic based on readily available raw materials and which can be prepared at the location at which it is to be formed into useful shapes.

Still another object is to provide a light-weight insulating material which is very adherent to ceramic, masonry, or metal surfaces after hardening.

Still another object is to provide a ceramic body highly resistant to deterioration by influences such as weathering, fire, high temperatures, vermin, and similar influences.

These and other objects are accomplished by suitably modifying the inventions described in our U.S. patent applications Serial Nos. 133,581 and 161,426, filed by us on August 24, 1961, and December 22, 1961, respectively, of which this application is a continuation-in-part.

Compositions based on alumina, lime, silica and phosphorous pentoxide such as those described in the above noted applications are known to set rapidly when the ingredients are brought together in suitable proportions and under suitable conditions.

Oxides suitable for the purpose of this invention are those that react with phosphorus pentoxide or phosphoric acid to produce a substantially clear sol or solution when excess phosphorus pentoxide or phosphoric acid is used with a vaporizable vehicle, such as water.

The oxides which are utilized for reaction as described above are basic oxides such as calcium oxide derived from a suitable compound and basic to neutral oxides such as aluminum oxide or zirconium oxide or compounds of these that are basic in reaction with phosphorus pentoxide.

These are reacted with phosphorus pentoxide or phosphoric acid in the ratio of 1 mole of oxide to 0.6 mole to 3 moles of phosphorus pentoxide. These are reacted in the presence of a vaporizable liquid vehicle such as water etc. where the water is no more than about 50 percent by weight of the sol or solution.

When proceeding in accordance with the present invention, the several constituents comprising the compositions in the above noted patent applications are brought together in the presence of sufficient liquid to form a relatively stiff or viscous paste. When the paste-like material begins hardening, i.e. very shortly after it has been prepared, finely divided solid material of a suitable nature is stirred into the paste. By matching the chemical nature of the added solid and the chemical composition of the paste, the materials which are brought together are selected so that they react chemically at room temperature and atmospheric pressure to form a gaseous reaction product which forms in the paste and which is trapped therein, in the form of fine bubbles. The chemical release of this gas and the physical entrapment of almost all of the gas in the ceramic mix causes the mass to expand in amounts ranging from slight expansion to many times its original volume depending on the time, temperature, nature and manner of addition of the foamant. When the gas evolution has ceased and the ceramic mass has set, it is found that it has hardened into a monolith exhibiting a typical foamed appearance. By the addition of one or more additives it is possible to improve the foam produced or its adherence to the surface against which it is applied or even to spray the foamed composition.

The invention will be better understood from the example which follows, which is intended to be illustrative of a preferred mode of practicing the invention and is not to be construed as limiting the invention in any way.

*Example*

Fifty (50) parts of weight of wollastonite, a finely divided substantially pure calcium silicate having the formula $CaSiO_3$, was mixed with an equal weight of an aluminum phosphate solution sold under the name Alkophos-CE (Monsanto) and having a composition represented by the formula $Al_2O_3 \cdot 3P_2O_5 \cdot xH_2O$. The mixture was permitted to stand in an open vessel at room temperature for about 5 minutes during which interval partial setting of the constituents occurred. Approximately five (5) parts by weight of powdered (−325 mesh, Tyler Standard) calcium carbonate ($CaCO_3$) was then stirred into the pasty, partially-set composition. Because of the acid nature of the mixture, a reaction occurred between the added calcium carbonate and the mix, with the consequent formation of carbon dioxide gas which was trapped in the somewhat thick paste. Complete hardening of the foamed mass took place in about 10 minutes after the calcium carbonate addition. The resulting material was resistant to temperatures above 2500° F. and exhibited the following properties:

Thermal conductivity __ 3.1 B.t.u./sq. ft./hr./°F./in. at 2100° F.
Specific Gravity _____ 0.29.
Dielectric constant ___ Less than 10.
Softening point _____ Above 2650° F.
Modulus of rupture ___ 2,900 pounds per square inch for non-porous solid.

Other means may be utilized to foam the compositions of the present invention at room temperature. For example, air or other gases may be introduced into the composition by beating, blowing, or by other mechanical means in place of the chemical method described above. Still other gas-liberating chemicals can be employed to form the composition without the application of external heat, in place of the calcium carbonate utilized in the example, including sulfites, carbonates, nitrites, and organic compounds which decompose either due to the chemical action of the acid in the mixture or due to the heat evolved by the exothermic reaction incident to the setting-up of the composition, or to a combination of both of these factors.

Aluminum phosphates which may be used in the practice of this invention should have proportions of alumina to phosphorus pentoxide in the range of one mole of alumina for each one of three moles of phosphorus pentoxide and the amount of water in which the aluminum phosphate is dissolved should constitute not more than about 50% by weight of this phosphate solution, which is then a somewhat viscous liquid. Utilizing aluminum phosphates of the type described, foamable, settable compositions have been prepared using proportions ranging between from 10 parts wollastonite and 90 parts of the aluminum phosphate to 70 parts wollastonite and 30 parts of the aluminum phosphate.

Preferred compositions possessing maximum strength when hardened or set are those where the phosphate composition such as aluminum phosphate, zirconium phosphate, or calcium phosphate react stoichiometrically with the calcium silicate.

The particle size of the calcium carbonate or other solid foaming additive and the time of addition both influence the nature of the foam produced. For example, finer particles generally produce finer gas pockets than coarser particles and early additions generally increase the expansion as compared with later additions which yield a product with greater density.

Changes may be made in the composition without departing from the intended scope of the invention. Instead of aluminum phosphate, a zirconium phosphate has been prepared by reacting a colloidal zirconia with phosphorus pentoxide to form a sol or solution which was mixed with wollastonite as in the example above and then foamed in the same manner, using calcium carbonate as the gas-liberating additive.

Similar bodies can be made using lime, reacted with phosphorus pentoxide to form a solution or sol, or the hydroxides or carbonates of aluminum, zirconium or calcium may be reacted with phosphorus pentoxide to form suitable acid phosphates. These can then be reacted with $CaSiO_3$ to produce composition suitable for foaming in the several modes described.

Formulation limits for the sol or solution, constituting the acidic phosphate portion of the composition are:

1 mole $Al_2O_3$: between 1 and 3 moles $P_2O_5$
1 mole $ZrO_2$: from 1 and 3 moles $P_2O_5$
1 mole $CaO$: between 0.6 and 3 moles $P_2O_5$ These are added to the water, in the form of oxides, carbonates, acetates, hydroxides or silicates to form a sol or solution in which the water constitutes no more than approximately 50 percent by weight of the said sol or solution.

This sol or solution then can be made to react with finely divided calcium silicate to form the settable body which is simultaneously foamed by the described procedures. The calcium silicate reacted with the sol or solution should be in the approximate range of 10 parts by weight calcium silicate to 90 parts by weight of said sol or solution and 70 parts by weight calcium silicate to 30 parts by weight of said sol or solution. The preferred proportion is approximately equal parts by weight of calcium silicate and acidic phosphate sol or solution.

One of the ways in which the properties of the compositions described above may be controlled is to control the size of the bubbles in the foam and therefore the pore size in the set composition, it having been determined that a pore size of 6 mm. or smaller produced an optimum combination of thermal and physical properties. To this end the incorporation of small amounts ranging from 0.01–0.3% of cationic surface active agents such as benzyl trimethyl ammonium chloride may be practiced. Other cationic surface active agents may be substituted without materially altering the benefits obtained thereby.

The strength of the foamed composition increases when the foam is subjected to temperatures above normal ambient room temperature. Heating the foam at 120° F. to 220° F. for a period of not less than 10 minutes serves to lighten the foam structure by driving off bound water and additionally strengthens the foam probably by promoting a more complete hardening or setting through continuation of the original chemical reaction. The strength is further increased by heating to temperatures below the softening point of the foam. These temperatures may range from about 220° F. to 2550° F. Care is taken to minimize thermal shock so that body integrity is maintained.

Because of the excess acid in the composition, bonding to metal is unusually good, but if desired this may be improved still further by either adding small amounts of specific acids to the composition in order to acid treat the metal substrate at the time the foamed composition is applied thereto. Alternatively the metals in question may be prepared by any of the conventional surface preparation treatments known in the art to accomplish a similar result. For example, steel surfaces may be phosphated or chromated prior to application of the foam thereto instead of relying on the phosphoric acid of the foamed composition to condition the metal; or with aluminum the surface may be anodized, or with iron or steel the surface may be blued. No particular additives have been found to be necessary to improve adherence to the paper when the foam is cast against or between kraft paper, in the preparation of building panels intended to be brought in finished form to the site.

A wide choice exists in the manner of applying the foam to the various surfaces indicated above. For example the foam may be sprayed in place using a gaseous propellant, Freon 12 being a particularly good propellant which may be mixed with any of the dry ingredients in the cold and which will be foamed by the exothermic reaction on mixing all the ingredients.

If desired, forms may be erected at the building site and the foam poured into them to form insulating jackets around load-bearing columns, or to form building panels with or without reinforcement at the site.

A particularly preferred composition comprises the following in parts by weight:

Alkophos CE _____ 30
Wollastonite _____ 30
Silica (140 mesh) _____ 30
37% HCl (specific gravity 1.19) _____ 25 to which between about 5 and 10 parts of finely divided calcium carbonate may be added as a foamant.

We claim:
1. A composition which sets into a rigid monolithic mass without application of externally applied heat and which may be rendered porous by incorporation of gas bubbles prior to complete setting of said composition; said composition consisting of:
   (a) water
   (b) an acidic phosphate consisting of phosphorous pentoxide and an oxide selected from the group consisting of lime, alumina, zirconia and compounds of said oxides which are basic in reaction with phosphorus pentoxide and which are dissolved in an excess of phosphoric acid; the proportions of said oxide to phosphorus pentoxide being 1 mole of said oxide to between 0.6 and 3 moles of phosphorus pentoxide; there being at least about 1 part by weight of acidic phosphate per part by weight of water; and
   (c) a finely divided calcium silicate, the relative proportions of calcium silicate to the total of phosphate plus water being approximately in the range of 10 parts by weight calcium silicate to 90 parts by weight said total of phosphate plus water and 70 parts by weight calcium silicate to 30 parts by weight said total of phosphate plus water.
2. A composition which sets into a rigid monolithic mass without application of externally applied heat and which may be rendered porous by incorporation of gas bubbles prior to complete setting of said composition; said composition consisting of:
   (a) water
   (b) an acidic aluminum phosphate consisting of phosphorus pentoxide and an oxide compound of alumina acting as a base in reaction with phosphorus pentoxide and soluble in an excess of phosphoric acid; the proportions of said oxide compound to phosphorus pentoxide being 1 mole of said oxide compound to between 0.6 and 3 moles of phosphorous pentoxide; there being at least about one part by weight of acidic phosphate per part by weight of water; and
   (c) a finely divided calcium silicate, the relative proportions of calcium silicate to the total of phosphate plus water being approximately in the range of 10 parts by weight calcium silicate to 90 parts by weight said total of phosphate plus water and 70 parts by weight calcium silicate to 30 parts by weight said total of phosphate plus water.
3. A composition which sets into a rigid monolithic mass without application of externally applied heat and which may be rendered porous by incorporation of gas bubbles prior to complete setting of said composition; said composition consisting of:
   (a) water
   (b) an acidic calcium phosphate consisting of phosphorus pentoxide and a calcium oxide compound soluble in an excess of phosphoric acid; the proportions of said oxide compound to phosphorus pentoxide being 1 mole of said oxide compound to between 0.6 and 3 moles of phosphorus pentoxide; there being at least about one part by weight of acidic phosphate per part by weight of water; and
   (c) a finely divided calcium silicate, the relative proportions of calcium silicate to the total of phosphate plus water being approximately in the range of 10 parts by weight calcium silicate to 90 parts by weight said total of phosphate plus water and 70 parts by weight calcium silicate to 30 parts by weight said total of phosphate plus water.
4. A composition which sets into a rigid monolithic mass without application of externally applied heat and which may be rendered porous by incorporation of gas bubbles prior to complete setting of said composition; said composition consisting of:
   (a) water
   (b) an acidic zirconium phosphate consisting of phosphorus pentoxide and zirconium oxide compound soluble in an excess of phosphoric acid; the proportions of said zirconium oxide compound to phosphorus pentoxide being 1 mole of said oxide compound to between 1 and 3 moles of phosphorus pentoxide; there being at least about one part by weight of acidic phosphate per part by weight of water; and
   (c) a finely divided calcium silicate, the relative proportions of calcium silicate to the total of phosphate plus water being approximately in the range of 10 parts by weight calcium silicate to 90 parts by weight said total of phosphate plus water and 70 parts by weight calcium silicate to 30 parts by weight said total of phosphate plus water.
5. The composition of claim 1 containing in addition a small amount of gas-liberating chemical compound selected from the group consisting of inorganic carbonates, sulfates, nitrites and nitrates which reacts with the acid in said composition to release a gaseous reaction product.
6. The composition of claim 1 foamed by mechanically introducing a gas into said composition while it is setting.
7. A composition according to claim 1 foamed by a combination of chemically introduced mechanically introduced gases.
8. The composition of claim 5 subjected to heating in the range from 120° F. to 2550° F. to lighten and further strengthen the foam.
9. The composition of claim 1 foamed and set into a monolithic mass against a support.
10. A foamed composition having the composition of claim 1, containing in addition, between 0.01 and 0.3% by weight of a cationic surface-active agent.

References Cited in the file of this patent
UNITED STATES PATENTS

| | | |
|---|---|---|
| 2,450,952 | Greger | Oct. 12, 1948 |
| 2,687,967 | Yedlick et al. | Aug. 31, 1954 |
| 2,881,081 | Hendricks | Apr. 7, 1959 |
| 2,965,464 | Rupprecht | Dec. 20, 1960 |
| 2,992,930 | Wheeler et al. | July 18, 1961 |
| 2,995,453 | Roble et al. | Aug. 8, 1961 |
| 2,996,389 | Fernhof | Aug. 15, 1961 |
| 3,041,205 | Iler | June 26, 1962 |